TELEPHONE SUPPORT AND SWITCH CONTROL MECHANISM

Filed Dec. 22, 1949 2 Sheets-Sheet 1

INVENTOR.
Chester W. Le Noir
BY Edward C. Healy
Attorney

TELEPHONE SUPPORT AND SWITCH CONTROL MECHANISM

Filed Dec. 22, 1949 2 Sheets-Sheet 2

INVENTOR.
Chester W. Le Noir
BY Edward C. Healy
Attorney

Patented Oct. 27, 1953 2,657,278

UNITED STATES PATENT OFFICE 2,657,278

TELEPHONE SUPPORT AND SWITCH CONTROL MECHANISM

Chester W. Le Noir, San Francisco, Calif.

Application December 22, 1949, Serial No. 134,533

2 Claims. (Cl. 179—149)

This invention relates to an improved time-saving device for adjustably supporting all handset telephones which device will permit the user thereof to have the entire body, including both hands, free for use at all times while telephoning, and which will greatly facilitate the opening and closing of the telephone circuit of said handset telephones.

The primary object of the present invention is the provision of a simple and inexpensive time-saving device which, when operated in connection with all handset telephones, will automatically close the telephone circuit when the receiver and transmitter unit of said handset telephone is pulled out to talking position and will open the telephone circuit when the said receiver and transmitter unit is pushed back.

Another object of the present invention is the provision of means whereby this time-saving device can be readily adjusted horizontally and vertically in the simplest manner to hold a handset telephone receiver and transmitter unit in any suitable position for its use.

A further object of the present invention is the provision of a mounting consisting of a base to which is affixed a pedestal, that said pedestal is apertured, and into said aperture is placed an inverted L-shaped arm which can revolve approximately 180 degrees; that secured to the said first arm by a lock nut is a smaller horizontal arm to which is adjustably affixed the mechanism for automatically opening and closing the telephone circuit by causing the hook switch plunger in a handset telephone base to be automatically raised or depressed upon movement of said first arm; that the second arm carries a suitable holder for the telephone receiver and transmitter unit pivotally mounted thereon; that said arms, when extended, permit the said receiver and transmitter unit to be used on both sides of the desk or stand.

A still further object of the present invention is to provide a specially constructed device for adjustably supporting a telephone receiver and transmitter unit, which device is durable, simple in construction, economical to manufacture, positive in operation and highly efficient and serviceable in use.

Other objects and advantages will be apparent during the course of the following description.

In the accompanying drawing forming a part of the specification, in which like numerals designate like parts throughout the several views, Fig. 1 is a perspective view of the device shown in its closing position.

Figure 2:
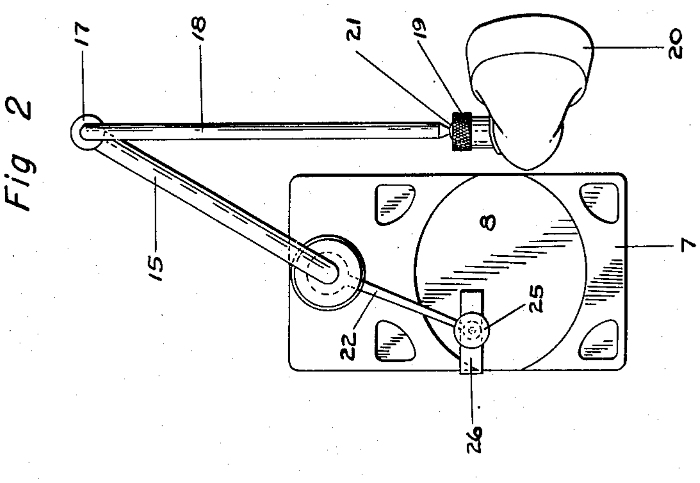
Fig. 2 is a top plan view of the same.
Figures 1, 3:
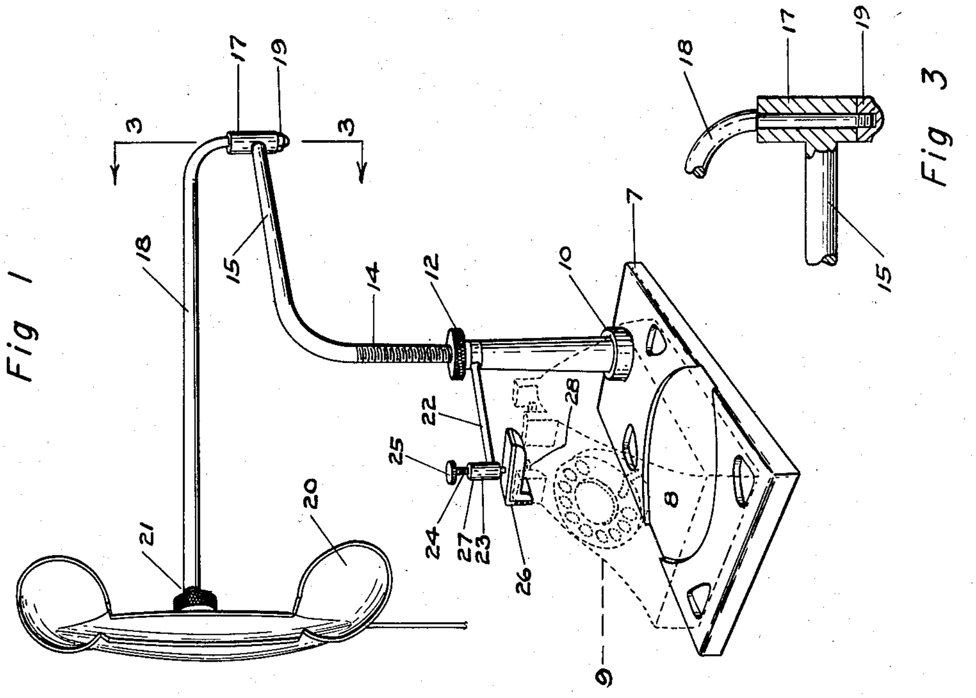
Fig. 3 is a vertical sectional fragmentary view taken through line 3—3 of Fig. 1.

Referring in detail to the drawings and numerals thereof, the numeral 7 designates the base member of the device, recessed as at 8, and adapted to receive and support a handset telephone 9 as illustrated in Fig. 1. The said base member is provided with a pedestal 10 internally apertured, which may be internally threaded as at 11, and provided with an internally threaded collar or nut 12. An externally inverted L-shaped arm designated as a whole by the number 13 is mounted in the pedestal, the vertical threaded portion being designated by the numeral 14 and the horizontal portion by the numeral 15. The said arm is fixed to a vertical bushing 17, into which a second inverted L-shaped arm 18 is mounted and retained in position by a suitable internally threaded cap designated by the numeral 19. It will be particularly noted that the holder for the telephone receiver and transmitter unit 20 can be readily manipulated to any desired position to suit the person operating the telephone, the ball and socket joint functioning to provide for the proper adjusting of the said receiver and transmitter unit.

Figures 4, 5, 6:
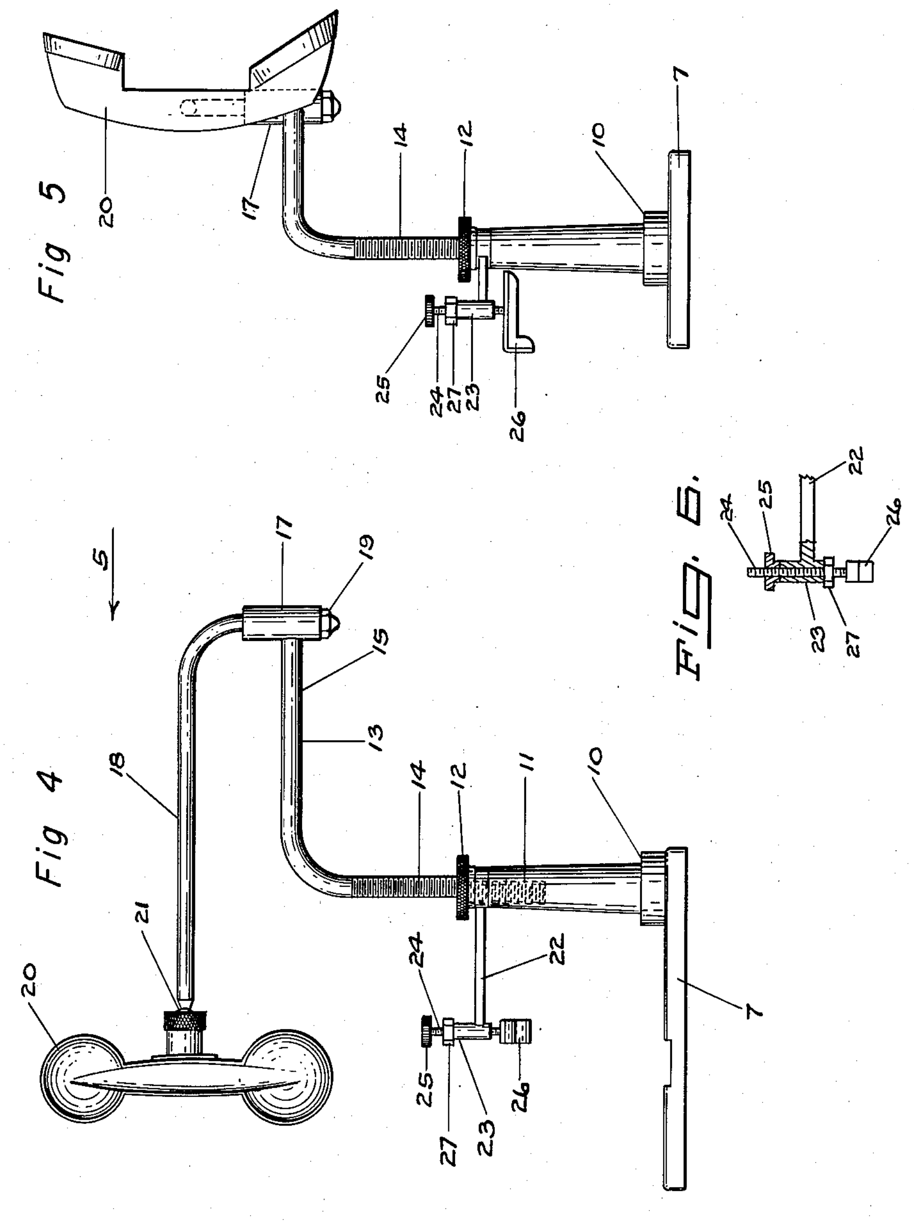
Fig. 4 is a vertical elevational view of the device.
Fig. 5 is a vertical end view looking at Fig. 4 in the direction of the arrow 5.
Fig. 6 is a sectional detail of a modified form of bushing and of the associated parts.

From the foregoing description taken in consideration with the accompanying drawings it will be readily observed that the device can be adjusted to any suitable height and can be swung to the right or left, the ball and socket joint 21 further providing a wide range of adjustment. A suitable arm 22 is revolvably mounted on the threaded stem 14 and is locked thereto by the threaded collar 12. The said arm is provided with an internally apertured vertical bushing 23 for accommodating a threaded stem 24, which stem is provided with a lock nut 25 on the upper portion and an adjustment nut 27, and with the hook switch plunger control bar 26 on the lower extremity, as disclosed to advantage in Fig. 4. The lock nut 25 functions to retain the said stem in a fixed position, while the adjusting nut 27 functions to raise or depress a bar 26 to proper height for controlling hook switch plunger 28 as shown by dotted buttons in Fig. 1. It will be noted that the bar 26 has a small hump on its lower side where contact is made with a hook switch plunger 28 to prevent unintentionally moving said bar 26 off the hook switch plunger 28. The said bar 26 automatically operates the hook switch plunger 28 and is controlled by movement of the arm 13. When the arms 13 and 18 are moved outwardly the said bar 26 is moved off the hook switch plunger 28, automatically closing the telephone circuit in the same manner as when the receiver and transmitter unit is removed from the telephone base cradle. When arms 13 and 18 are moved inwardly the said bar 26 is moved back upon the hook switch plunger 28, thus automatically opening the telephone circuit in the same manner as when the receiver and transmitter unit is replaced in the telephone base cradle. The lower side of the inner end of the said bar 26 is curved as shown in 26 of Figs. 1 and 5, to facilitate the operation of gradually depressing or releasing automatically the hook switch plunger.

The device can be equipped with a night automatic dial lamp which indicates if the telephone circuit is open or closed.

Said arm 13 can be adjusted for height by raising or lowering arm 22 and threaded collar 12 on threaded portion of arm 14 or can be adjusted for length by adding an extension to arm 21, and said receiver and transmitter unit holder 20 can readily be adjusted for use for either the right or left ear.

The device base 7 can be formed of any suitable material and in any desired shape to fit handset telephone bases having a rectangular, round or oval shape. In lieu of recesses 8, suitable holes can be drilled in base 7, into which pegs can be inserted to hold the telephone base 9 in required position on said base 7.

Many types of attachments can be provided with or affixed to said device for holding thereon various types of desk equipment.

It is to be understood that the form of my invention herewith shown and described is to be taken as a preferred example of the same and that various changes relative to the material, size, shape, and arrangement of parts may be resorted to without departing from the spirit of the invention or the scope of the subjoined claims.

Having thus described my invention, I claim:

1. In combination with a handset telephone having a receiver and transmitter unit and a base unit with a hook switch plunger in the base for controlling the telephone circuit, a time-saving device for adjustably supporting said telephone base unit and receiver and transmitter unit, comprising a base member capable of supporting said telephone base in a fixed position thereon, a pedestal affixed to the said base member, an inverted L-shaped arm having the vertical portion pivotally supported in said pedestal and the upper portion horizontally extending therefrom and a second arm pivotally connected to the outer extremity of the said horizontal portion of the first arm, a telephone receiver and transmitter unit holder positioned on the outer extremity of the second arm, means, including an adjustable ball and socket joint, for connecting the telephone receiver and transmitter unit holder to the outer extremity of the second arm, and means associated with the first arm for automatically raising or depressing said hook switch plunger to close and open the telephone circuit when movement is imparted to said arms.

2. In combination with a handset telephone having a base and receiver and transmitter unit and a switch for controlling the telephone circuit, a device for adjustably supporting the said telephone base and units associated therewith comprising a flat base member, a pedestal fixed thereon, an arm threadedly mounted in the pedestal and adapted to be vertically adjustable with respect to the same, an inverted L-shaped arm pivotally secured to the first arm and horizontally extending therefrom, a telephone transmitter unit positioned on the outer extremity of the inverted L-shaped arm, and a ball and socket joint adjustably connecting the telephone unit to the said arm.

CHESTER W. LE NOIR.

References Cited in the file of this patent

UNITED STATES PATENTS

| Number | Name | Date |
|---|---|---|
| 2,310,032 | Mathieson | Feb. 2, 1943 |
| 2,435,816 | Anderson | Feb. 10, 1948 |

FOREIGN PATENTS

| Number | Country | Date |
|---|---|---|
| 56,281 | Sweden | Mar. 15, 1924 |
| 198,017 | Germany | Apr. 28, 1908 |